(12) United States Patent
Subramaniam et al.

(10) Patent No.: US 7,890,144 B2
(45) Date of Patent: *Feb. 15, 2011

(54) SUCCESSIVE INTERFERENCE CANCELLATION RECEIVER PROCESSING WITH SELECTION DIVERSITY

(75) Inventors: Anand D. Subramaniam, Chennai (IN); Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/257,200

(22) Filed: Oct. 23, 2008

(65) Prior Publication Data
US 2009/0046802 A1 Feb. 19, 2009

Related U.S. Application Data

(63) Continuation of application No. 11/137,982, filed on May 24, 2005, now Pat. No. 7,457,639, which is a continuation of application No. 10/670,079, filed on Sep. 23, 2003, now Pat. No. 6,917,821.

(51) Int. Cl.
H04B 1/38 (2006.01)
H04B 17/00 (2006.01)
(52) U.S. Cl. .................... 455/562.1; 370/334; 375/299
(58) Field of Classification Search ............ 455/67.11, 455/101–103, 272, 562.1; 370/319, 334–335, 370/344; 375/260, 267, 299
See application file for complete search history.

(56) References Cited

U.S. PATENT DOCUMENTS 6,801,580 B2 10/2004 Kadous
6,917,821 B2 7/2005 Kadous et al.
7,092,737 B2 8/2006 Horng et al.
7,116,652 B2 10/2006 Lozano (Continued)

FOREIGN PATENT DOCUMENTS

CN 1325198 12/2001

(Continued)

OTHER PUBLICATIONS

Written Opinion—PCT/US04/027039, International Search Authority—US: May 18, 2005.

(Continued)

Primary Examiner—Lee Nguyen
(74) Attorney, Agent, or Firm—Peng Zhu; Stanton Braden

(57) ABSTRACT

Techniques are provided to support successive interference cancellation (SIC) receiver processing with selection diversity whereby each of $N_T$ transmit antennas may be turned on or off. One symbol stream may be transmitted from each transmit antenna. A SIC receiver recovers the transmitted symbol streams in a specific order. Up to $N_T!$ orderings are evaluated. For each ordering, $N_T$ post-detection SNRs are obtained for $N_T$ transmit antennas and used to determine $N_T$ data rates, where the data rate is zero if the post-detection SNR is worse than a minimum required SNR. An overall data rate is computed for each ordering based on the $N_T$ data rates. The ordering with the highest overall data rate is selected for use. Up to $N_T$ symbol streams are processed at the data rates for the selected ordering and transmitted. The transmitted symbol streams are recovered in accordance with the selected ordering.

12 Claims, 6 Drawing Sheets

U.S. PATENT DOCUMENTS

| | | | |
|---|---|---|---|
| 7,457,639 B2 * | 11/2008 | Subramaniam et al. | 455/562.1 |
| 7,466,743 B2 | 12/2008 | Naguib | |
| 7,499,709 B2 | 3/2009 | Das et al. | |
| 2003/0125040 A1 | 7/2003 | Walton et al. | |

FOREIGN PATENT DOCUMENTS

| | | |
|---|---|---|
| EP | 0951091 | 10/1999 |
| WO | 03001726 | 1/2003 |

OTHER PUBLICATIONS

International Preliminary Report on Patentability—PCT/US04/027039, IPEA—US, Jun. 23, 2005.

Lucent Technologies; "Increasing MIMO throughout with per-antenna rate control," 3GPP TSG RAN WG1, TSG R1 (01)0879, Aug. 28, 2001.

International Search Report—PCT/US04/027039, International Search Authority—US, May 18, 2005.

Supplementary European Search Report-EP04781672, Search Authority, Munich Patent Office, Oct. 20, 2009.

Kadous "Ordered H-Blast for MIMO/OFDM Systems over Multipath Channels." Computers and Communication, 2003, (ISCC 2003), IEEE, Jul. 3, 2003, vol. 1, pp. 481-485.

Suda et al.: "Transmit Antenna Selectable MIMO Channel Transmission Scheme." National Conference Record of the Institute of Electronic Information and Communication Engineers, IEICE, Communication 1, Mar. 3, 2003, p. 622, B-5-163.

Teng et al.: Performance Analysis of SDM-OFDM System with Adaptive Modulation Method over MIMO Channels. Technical Report of the Institute of Electronic Information and Communication Engineers, IEICE, May 16, 2003, vol. 3, pp. 75-82, RCS 2003-41.

* cited by examiner

SUCCESSIVE INTERFERENCE CANCELLATION RECEIVER PROCESSING WITH SELECTION DIVERSITY

CLAIM OF PRIORITY UNDER 35 U.S.C. §120

The present application for patent is a continuation of U.S. patent application Ser. No. 11/137,982, entitled "Successive Interference Cancellation Receiver Processing With Selection Diversity", filed May 24, 2005, now allowed, which is a continuation of U.S. patent application Ser. No. 10/670,079, entitled "Successive Interference Cancellation Receiver Processing With Selection Diversity", filed Sep. 23, 2003, now U.S. Pat. No. 6,917,821, both assigned to the assignee hereof and hereby expressly incorporated by reference in their entirety.

BACKGROUND

1. Field

The present invention relates generally to communication, and more specifically to techniques for supporting successive interference cancellation (SIC) receiver processing with selection diversity in a multiple-input multiple-output (MIMO) communication system.

2. Background

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels corresponds to a dimension. The MIMO system can provide improved performance (e.g., increased transmission capacity and/or greater reliability) if the additional dimensionalities created by the multiple transmit and receive antennas are utilized.

For a full-rank MIMO channel, with $N_S=N_T \leq N_R$, a transmitter may process (e.g., encode, interleave, and modulate) $N_T$ data streams to obtain $N_T$ symbol streams, which are then transmitted from the $N_T$ transmit antennas. The transmitted symbol streams may experience different channel conditions (e.g., different fading and multipath effects) and may achieve different received signal-to-noise ratios (SNRs). Moreover, due to scattering in the communication link, the transmitted symbol streams interfere with each other at a receiver.

The receiver receives the $N_T$ transmitted symbol streams via $N_R$ receive antennas. The receiver may employ a successive interference cancellation (SIC) processing technique to process the $N_R$ received symbol streams from the $N_R$ receive antennas to recover the $N_T$ transmitted symbol streams. A SIC receiver processes the received symbol streams in $N_T$ successive stages to recover one transmitted symbol stream in each stage. For each stage, the SIC receiver initially performs spatial or space-time processing on the received symbol streams to obtain "detected" symbol streams, which are estimates of the transmitted symbol streams. One of the detected symbol streams is selected for recovery. The receiver then processes (e.g., demodulates, deinterleaves, and decodes) this detected symbol stream to obtain a decoded data stream, which is an estimate of the data stream for the symbol stream being recovered.

Each "recovered" symbol stream (i.e., each detected symbol stream that is processed to recover the transmitted data stream) is associated with a particular "post-detection" SNR, which is the SNR achieved after the spatial or space-time processing at the receiver. With SIC processing, the post-detection SNR of each recovered symbol stream is dependent on that stream's received SNR and the particular stage in which the symbol stream is recovered. In general, the post-detection SNR progressively improves for later stages because the interference from symbol streams recovered in prior stages is canceled (assuming that the interference cancellation is effectively performed).

The $N_T$ transmit antennas are associated with $N_T$ post-detection SNRs achieved by the $N_T$ symbol streams sent from these antennas. These $N_T$ post-detection SNRs are obtained for a specific ordering of recovering the $N_T$ symbol streams at the receiver. It can be shown that there are $N_T!$ possible orderings of recovering the $N_T$ symbol streams and thus $N_T!$ possible sets of post-detection SNRs, where "!" denotes a factorial. The receiver may evaluate all $N_T!$ possible orderings and select the ordering that provides the best set of post-detection SNRs.

The post-detection SNR of a transmit antenna determines its transmission capacity. Depending on the channel conditions, the post-detection SNR of a given transmit antenna may be so low that it cannot support the lowest data rate for the MIMO system. In this case, it may be beneficial to turn off that transmit antenna and only use the remaining transmit antennas for data transmission. Turning off a transmit antenna that cannot support the lowest data rate eliminates a symbol stream that would otherwise have interfered with the other symbol streams. This may then improve the post-detection SNRs of the other symbol streams.

Selection diversity refers to using only transmit antennas that can support at least the lowest data rate and turning off transmit antennas that cannot support the lowest data rate. If each transmit antenna can be turned on or off independently, then it can be shown that there are $$N_{total} = (N_T!) \cdot \left(1 + \frac{1}{1!} + \frac{1}{2!} + \ldots \frac{1}{(N_T-1)!}\right)$$

possible orderings to evaluate. For example, if $N_T=4$, then there are $N_T!=24$ possible orderings without selection diversity whereby all $N_T$ transmit antennas are used, and $N_{total}=64$ possible orderings with selection diversity whereby each transmit antenna may be turned on or off independently. This represents a large increase in the number of orderings that the receiver may need to evaluate for selection diversity.

There is therefore a need in the art for techniques to support SIC receiver processing with selection diversity without the need to evaluate all $N_{total}$ possible orderings.

SUMMARY

Techniques are provided herein to support SIC receiver processing with selection diversity whereby at most $N_T!$ possible orderings are evaluated to determine (1) the data rates to use for the symbol streams sent from the $N_T$ transmit antennas and (2) the best ordering for recovering the transmitted symbol streams. Each of the at most $N_T!$ possible orderings is evaluated using SIC receiver processing (as described below) to obtain $N_T$ post-detection SNRs for $N_T$ transmit antennas. The data rate for each transmit antenna is determined based on its post-detection SNR. A set of discrete data rates may be supported by the system, and the data rate for each transmit antenna is then one of the discrete data rates. A zero or null data rate is used for each transmit antenna having a post-detection SNR that is worse than the minimum required SNR (e.g., the required SNR for the lowest non-zero data rate supported by the system). $N_T$ data rates are obtained for $N_T$ transmit antennas for each ordering. An overall data rate is computed for each ordering based on these $N_T$ data rates. The ordering with the highest overall data rate is selected for use. A transmitter processes up to $N_T$ symbol streams at the data rates for the selected ordering and transmits these symbol streams from the $N_T$ transmit antennas. A receiver recovers the transmitted symbol streams in accordance with the selected ordering.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for supporting SIC receiver processing with selection diversity may be used in various communication systems, such as a MIMO system, a MIMO system that employs orthogonal frequency division multiplexing (i.e., a MIMO-OFDM system), and so on. For clarity, these techniques are described specifically for a MIMO system. For simplicity, the following description assumes that (1) one data stream is transmitted from each transmit antenna and (2) each data stream is independently processed at a transmitter and may be individually recovered at a receiver.

Figure 1:
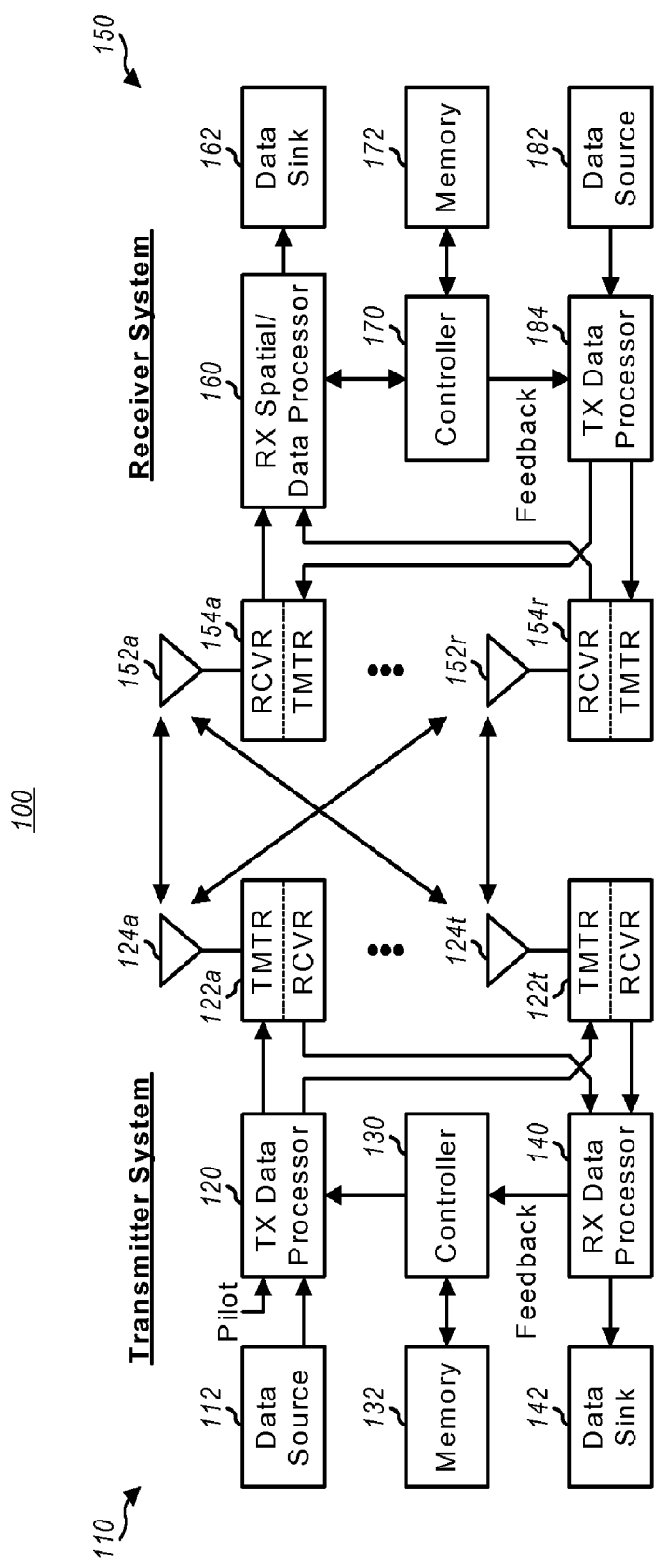
FIG. 1 shows a transmitter system and a receiver system in a MIMO system.

FIG. 1 shows a block diagram of a transmitter system 110 and a receiver system 150 in a MIMO system 100. Transmitter system 110 and receiver system 150 may each be implemented in an access point (i.e., a base station) or a user terminal in the MIMO system.

At transmitter system 110, a transmit (TX) data processor 120 receives traffic data from a data source 112 for up to $N_T$ data streams. Each data stream is designated for transmission from a respective transmit antenna. TX data processor 120 formats, codes, interleaves, and modulates the traffic data for each data stream to obtain a corresponding stream of modulation symbols (or "data symbols"). TX data processor 120 may further multiplex pilot symbols with the data symbols. TX data processor 120 provides $N_T$ symbol streams to $N_T$ transmitter units (TMTR) 122a through 122t. Each symbol stream may include any combination of data and pilot symbols. Each transmitter unit 122 processes its symbol stream and provides a modulated signal suitable for transmission over the wireless communication link. $N_T$ modulated signals from transmitter units 122a through 122t are transmitted from $N_T$ antennas 124a through 124t, respectively.

At receiver system 150, the transmitted modulated signals are received by $N_R$ antennas 152a through 152r, and the received signal from each antenna 152 is provided to a respective receiver unit (RCVR) 154. Each receiver unit 154 conditions and digitizes its received signal and provides a stream of received symbols. A receive (RX) spatial/data processor 160 receives the $N_R$ received symbol streams from $N_R$ receiver units 154a through 154r, processes these received symbol streams using SIC receiver processing, and provides $N_T$ decoded data streams. The processing by RX spatial/data processor 160 is described in detail below. RX spatial/data processor 160 further estimates the channel response between the $N_T$ transmit antennas and the $N_R$ receive antennas, the received SNRs and/or the post-detection SNRs of the symbol streams, and so on (e.g., based on the received pilot symbols). RX spatial/data processor 160 may use the channel response estimate to perform spatial or space-time processing, as described below.

Controllers 130 and 170 direct the operation at transmitter system 110 and receiver system 150, respectively. Memory units 132 and 172 provide storage for program codes and data used by controllers 130 and 170, respectively.

In an embodiment, controller 170 receives the channel response estimates and the SNR estimates from RX spatial/data processor 160, determines the data rate to use for each transmit antenna and the specific ordering for recovering the symbol streams, and provides feedback information for transmitter system 110. The feedback information may include, for example, the data rates for the $N_T$ transmit antennas. The feedback information is processed by a TX data processor 184, conditioned by transmitter units 154a through 154r, and transmitted back to transmitter system 110. At transmitter system 110, the modulated signals from receiver system 150 are received by antennas 124, conditioned by receiver units 122, and processed by an RX data processor 140 to recover the feedback information sent by receiver system 150. Controller 130 receives and uses the recovered feedback information to (1) control the data rate for the symbol stream sent from each transmit antenna, (2) determine the coding and modulation scheme to use for each data stream, and (3) generate various controls for TX data processor 120.

In another embodiment, controller 130 obtains the channel response estimates for the MIMO channel and the noise variance (i.e., noise floor) at receiver system 150. Controller 130 then determines the data rate to use for each transmit antenna and provides various controls for TX data processor 120. Transmitter system 110 may obtain the channel response estimates based on pilot symbols sent by receiver system 150. The receiver noise floor may be estimated by receiver system 150 and sent to transmitter system 110 as feedback information.

In general, the data rates for the transmit antennas and the ordering for recovering the symbol streams may be determined by the transmitter system, the receiver system, or both. For clarity, the following description is for the embodiment whereby the data rates and the ordering are determined by the receiver system and communicated to the transmitter system.

The model for the MIMO system may be expressed as:

$$\underline{y} = \underline{H}\underline{x} + \underline{n}, \qquad \text{Eq (1)}$$

where $\underline{y}$ is a vector of $N_R$ received symbols, i.e., $\underline{y}=[y_1 \ y_2 \ \ldots \ y_{N_R}]^T$, where $y_i$ is the symbol received on receive antenna i and $i \in \{1, \ldots, N_R\}$;

$\underline{x}$ is a vector of $N_T$ transmitted symbols, i.e., $\underline{x}=[x_1 \ x_2 \ \ldots \ x_{N_T}]^T$, where $x_j$ is the symbol sent from transmit antenna j and $j \in \{1, \ldots, N_T\}$;

$\underline{H}$ is an $N_R \times N_T$ channel response matrix for the MIMO channel, with entries of $h_{ij}$ for $i \in \{1, \ldots, N_R\}$ and $j \in \{1, \ldots, N_T\}$, where $h_{ij}$ is the complex channel gain between transmit antenna j and receive antenna i;

n is additive white Gaussian noise (AWGN); and

"$T$" denotes the transpose.

The noise $\underline{n}$ has a mean vector of $\underline{0}$ and a covariance matrix of $\underline{\Lambda}=\sigma^2 \underline{I}$, where $\underline{0}$ is a vector of zeros, $\underline{I}$ is the identity matrix, and $\sigma^2$ is the variance of the noise (which is also referred to as the receiver noise floor). For simplicity, the MIMO channel is assumed to be a flat-fading narrowband channel. In this case, the elements of the channel response matrix $\underline{H}$ are scalars, and the coupling $h_{ij}$ between each transmit-receive antenna pair can be represented by a single scalar value. The techniques described herein may also be used for a frequency selective channel having different channel gains at different frequencies.

Due to scattering in the communication link, the $N_T$ symbol streams transmitted from the $N_T$ transmit antennas interfere with each other at the receiver. In particular, each transmitted symbol stream is received by all $N_R$ receive antennas at different amplitudes and phases, as determined by the complex channel gains between the transmit antenna for that symbol stream and the $N_R$ receive antennas. Each received symbol stream includes a component of each of the $N_T$ transmitted symbol streams. The $N_R$ received symbol streams would collectively include all $N_T$ transmitted symbols streams, and instances of each of the $N_T$ transmitted symbol streams can be found in each of the $N_R$ received symbol streams.

The SIC receiver processing technique, which is also referred to as successive nulling/equalization and interference cancellation processing technique, can process the $N_R$ received symbol streams to obtain the $N_T$ transmitted symbol streams. The SIC receiver processing technique successively recovers the transmitted symbol streams in multiple stages, one stage for each symbol stream. Each stage recovers one transmitted symbol stream. As each symbol stream is recovered, the interference it causes to the remaining not yet recovered symbol streams is estimated and canceled from the received symbol streams to obtain "modified" symbol streams. The modified symbol streams are then processed by the next stage to recover the next transmitted symbol stream. If the symbol streams can be recovered without error (or with minimal errors) and if the channel response estimates are reasonably accurate, then the interference due to the recovered symbol streams can be effectively canceled. Each subsequently recovered symbol stream thus experiences less interference and may achieve a higher post-detection SNR than without interference cancellation.

Figure 6:
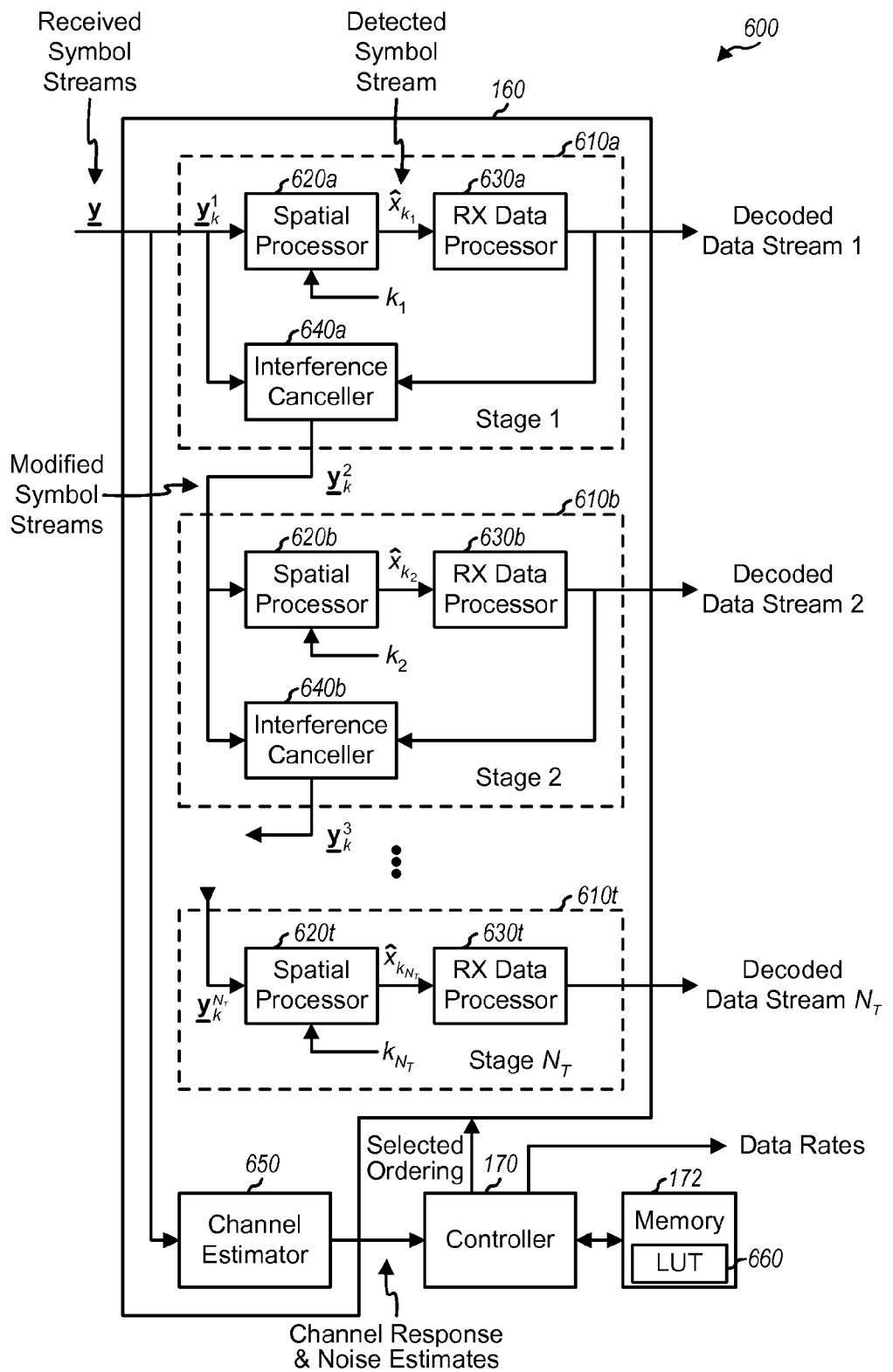
FIG. 6 shows a block diagram of a receiver subsystem.

The following terminology is used for the description below:

"transmitted" symbol streams—the symbol streams transmitted from the transmit antennas;

"received" symbol streams—the inputs to a spatial or space-time processor in the first stage of a SIC receiver (see FIG. 6);

"modified" symbol streams—the inputs to a spatial or space-time processor in a subsequent stage of the SIC receiver;

"detected" symbol streams—the outputs from the spatial or space-time processor (up to $N_T-l+1$ symbol streams may be detected in stage l); and "recovered" symbol stream—a symbol stream that is recovered by the receiver to obtain a decoded data stream (only one detected symbol stream is recovered in each stage).

Figure 2:
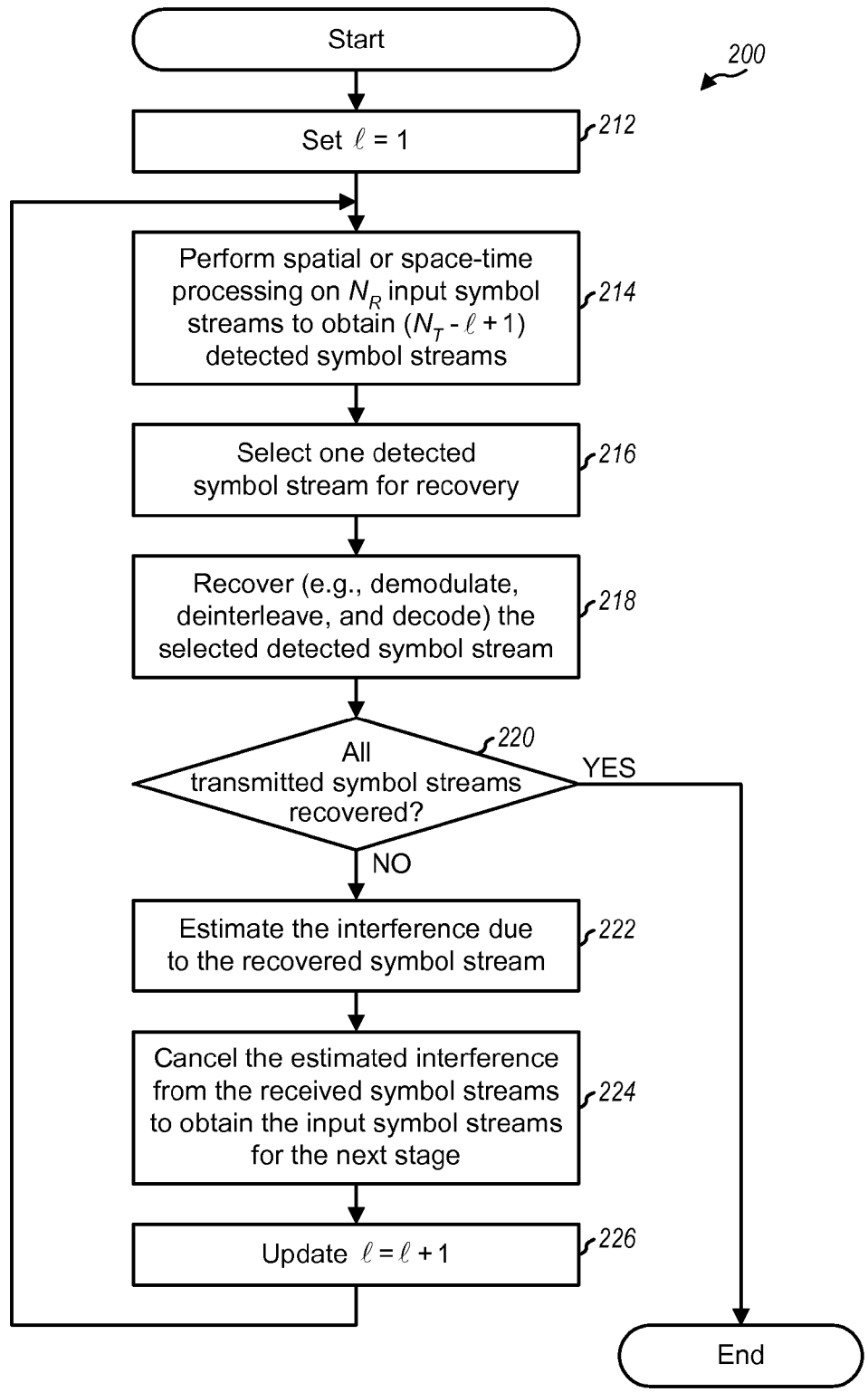
FIG. 2 shows a process for performing SIC receiver processing on $N_R$ received symbol streams to recover $N_T$ transmitted symbol streams.

FIG. 2 shows a flow diagram of a process 200 for performing SIC receiver processing on $N_R$ received symbol streams to recover $N_T$ transmitted symbol streams. Initially, the index l for the stages of a SIC receiver is set to 1 (i.e., l=1) (step 212). For the first stage, the SIC receiver performs spatial or space-time processing on the $N_R$ received symbol streams (as described below) to separate out the $N_T$ transmitted symbol streams (step 214). For each stage, the spatial or space-time processing provides ($N_T-l+1$) detected symbol streams, which are estimates of the transmitted symbol streams not yet recovered. One of the detected symbol streams is selected for recovery (step 216). This detected symbol stream is then processed (e.g., demodulated, deinterleaved, and decoded) to obtain a decoded data stream, which is an estimate of the data stream for the symbol stream being recovered in this stage (step 218).

A determination is then made whether or not all transmitted symbol streams have been recovered (step 220). If the answer is 'yes' (i.e., if $l=N_T$), then process 200 terminates. Otherwise, the interference due to the just recovered symbol stream is estimated (step 222). To obtain the interference estimate, the decoded data stream is re-encoded, interleaved, and re-modulated with the same coding, interleaving, and modulation schemes used at the transmitter for this data stream to obtain a "remodulated" symbol stream, which is an estimate of the transmitted symbol stream just recovered. The remodulated symbol stream is then processed with the channel response estimates to obtain $N_R$ interference components, which are estimates of the interference due to the just recovered symbol stream on the remaining not yet recovered symbol streams. The $N_R$ interference components are then subtracted from the $N_R$ received symbol streams to obtain $N_R$ modified symbol streams (step 224). These modified symbol streams represent the streams that would have been received if the just recovered symbol stream had not been transmitted (i.e., assuming that the interference cancellation was effectively performed). The index l is then updated (i.e., l=l+1) for the next stage (step 226).

Steps 214 through 218 are then repeated on the $N_R$ modified symbol streams to recover another transmitted symbol stream. Steps 214 through 218 are repeated for each transmitted symbol stream to be recovered. Steps 222 through 226 are performed if there is another transmitted symbol stream to recover. For the first stage, the input symbol streams are the $N_R$ received symbol streams. For each subsequent stage, the input symbol streams are the $N_R$ modified symbol streams from the preceding stage. The processing for each stage proceeds in similar manner.

For a SIC receiver, there are $N_T!$ possible orderings of recovering $N_T$ transmitted symbol streams. This is because any one of $N_T$ detected symbol streams may be recovered in the first stage, any one of ($N_T-1$) detected symbol streams may be recovered in the second stage, and so on, and only one detected symbol stream is available and recovered in the last stage. The SIC receiver can evaluate each of the $N_T!$ possible orderings and select the best ordering for use. In the following description, the index k is used for the $N_T!$ orderings, where $k \in \{1, 2, \ldots N_T!\}$. For each ordering k, the order in which the $N_T$ transmit antennas are recovered is represented as $\{k_1,$ $k_2, \ldots k_{N_T}\}$, where $k_l$ for $l \in \{1, 2, \ldots N_T\}$ denotes the transmit antenna to be recovered in stage l of ordering k.

For a SIC receiver, the input symbol streams for stage l of ordering k may be expressed as:

$$\underline{y}_k^l = \underline{H}_k^l \underline{x}_k^l + \underline{n}, \qquad \text{Eq (2)}$$

where $\underline{y}_k^l$ is a vector of $N_R$ modified symbols for stage l of ordering k, i.e., $$\underline{y}_k^l = \begin{bmatrix} y_{k_1}^l & y_{k_2}^l & \cdots & y_{k_{N_R}}^l \end{bmatrix}^T,$$

where $y_{k_i}^l$ is the modified symbol for receive antenna i in stage l of ordering k;
$\underline{x}_k^l$ is a vector of $(N_T-l+1)$ transmitted symbols for stage l of ordering k, i.e., $$\underline{x}_k^l = \begin{bmatrix} x_{k_l} & x_{k_{l+1}} & \cdots & x_{k_{N_T}} \end{bmatrix}^T,$$

where $x_{k_n}$ is the symbol sent from transmit antenna $k_n$; and
$\underline{H}_k^l$ is an $N_R \times (N_T-l+1)$ reduced channel response matrix for stage l of ordering k.

Equation (2) assumes that the symbol streams recovered in the prior (l−1) stages are cancelled. The dimensionality of the channel response matrix $\underline{H}$ is thus successively reduced by one column for each stage as a transmitted symbol stream is recovered and canceled. For stage l, the reduced channel response matrix $\underline{H}_k^l$ is obtained by removing (l−1) columns in the original matrix H corresponding to the (l−1) previously recovered symbol streams, i.e.

$$\underline{H}_k^l = \begin{bmatrix} \underline{h}_{k_l} & \underline{h}_{k_{l+1}} & \cdots & \underline{h}_{k_{N_T}} \end{bmatrix},$$

where $\underline{h}_{k_n}$ is an $N_R \times 1$ vector for the channel response between transmit antenna $k_n$ and the $N_R$ receive antennas. For stage l, the (l−1) previously recovered symbol streams are given indices of $\{k_1, k_2, \ldots k_{l-1}\}$ and the $(N_T-l+1)$ not yet recovered symbol streams are given indices of $\{k_l, k_{l+1}, \ldots k_{N_T}\}$. Equation (2) may be rewritten as:

$$\underline{y}_k^l = \sum_{n=l}^{N_T} \underline{h}_{k_n} x_{k_n} + \underline{n}. \qquad \text{Eq (3)}$$

For stage l, each of the $(N_T-l+1)$ transmitted symbol streams that have not yet been recovered may be "isolated" or "detected" by filtering the $N_R$ modified symbol streams $\underline{y}_k^l$ with a matched filter for that symbol stream. The matched filter for the symbol stream sent from transmit antenna $k_n$, for $n \in \{l, l+1, \ldots N_T\}$, has a unit-norm vector $\underline{w}_{k_n}$ of $N_R$ filter coefficients. To minimize interference from the other $(N_T-l)$ not yet recovered symbol streams on the symbol stream sent from transmit antenna $k_n$, the vector $\underline{w}_{k_n}$ is defined to be orthogonal to the channel response vectors $\{\underline{h}_{k_m}\}$ for these not yet recovered symbol streams, i.e., $\underline{w}_{k_n}^H \underline{h}_{k_m} = 0$, for $m \in \{l, l+1, \ldots N_T\}$ and $m \neq n$. For stage l, the transmitted symbol streams from the other (l−1) transmit antennas, $k_n$ for $n \in \{1, 2, \ldots l-1\}$, have already been recovered in prior stages and canceled from the modified symbol streams $\underline{y}_k^l$. Thus, the vector $\underline{w}_{k_n}$ does not need to be orthogonal to $\{\underline{h}_{k_m}\}$, for $m \in \{1, 2, \ldots l-1\}$.

The matched filter vector $\underline{w}_{k_n}$ may be derived based on various spatial and space-time processing techniques. The spatial processing techniques include a zero-forcing technique (which is also referred to as a channel correlation matrix inversion (CCMI) technique) and a minimum mean square error (MMSE) technique. The space-time processing techniques include a decision feedback equalizer (DFE), an MMSE linear equalizer (MMSE-LE), and a maximum-likelihood sequence estimator (MLSE).

In an embodiment, the matched filter response $\underline{w}_{k_n}$ is derived with a linear zero-forcing equalizer, which performs spatial processing by projecting the received symbol streams over an interference-free sub-space to obtain the detected symbol streams. The linear ZF equalizer for stage l has an $N_R \times (N_T-l+1)$ response matrix $\underline{W}_k^l$, which may be derived based on the reduced channel response matrix $\underline{H}_k^l$, as follows:

$$\underline{W}_k^l = \underline{H}_k^l ((\underline{H}_k^l)^H \underline{H}_k^l)^{-1}. \qquad \text{Eq (4)}$$

Since $\underline{H}_k^l$ is different for each stage, $\underline{W}_k^l$ is also different for each stage. The matched filter response $\underline{w}_{k_n}$ for the symbol stream sent from transmit antenna $k_n$ is then the column of $\underline{W}_k^l$ corresponding to transmit antenna $k_n$.

Stage l of the SIC receiver can derive $(N_T-l+1)$ detected symbol streams, as follows:

$$\hat{\underline{x}}_k^l = (\underline{W}_k^l)^H \underline{y}_k^l = \underline{x}_k^l + (\underline{W}_k^l)^H \underline{n}, \qquad \text{Eq (5)}$$

where $$\hat{\underline{x}}_k^l = \begin{bmatrix} \hat{x}_{k_l} & \hat{x}_{k_{l+1}} & \cdots & \hat{x}_{k_{N_T}} \end{bmatrix}^T$$

and $\hat{x}_{k_n}$ represents the detected symbol stream from transmit antenna $k_n$. As shown in the right-hand side of equation (5), the detected symbol streams $\hat{\underline{x}}_k^l$ comprise the transmitted symbol streams $\underline{x}_k^l$ plus filtered noise, $(\underline{W}_k^l)^H \underline{n}$, which is in general correlated with a covariance matrix $\Sigma = \sigma^2 (\underline{W}_k^l)^H \underline{W}_k^l$.

In stage l of ordering k, the symbol stream sent from transmit antenna $k_l$ is selected for recovery. The detected symbol stream $\hat{x}_{k_l}$ from transmit antenna $k_l$ may be expressed as:

$$\hat{x}_{k_l} = \underline{w}_{k_l}^H \underline{y}_k^l = x_{k_l} + \underline{w}_{k_l}^H \underline{n}. \qquad \text{Eq (6)}$$

As shown in the right-hand side of equation (6), the detected symbol stream $\hat{x}_{k_l}$ comprises the transmitted symbol stream $x_{k_l}$ plus post-detection or filtered noise $\underline{w}_{k_l}^H \underline{n}$.

The post-detection SNR, $SNR_{k_l}$, of the detected symbol stream $\hat{x}_{k_l}$ recovered in stage l of ordering k may be expressed as:

$$SNR_{k_l} = \frac{1}{\sigma^2 \|\underline{w}_{k_l}\|^2}, \qquad \text{Eq (7)}$$

where the expected variance of the transmitted data symbol $x_{k_l}$ is equal to 1.0, and $\sigma^2 \|\underline{w}_{k_l}\|^2$ is the variance of the post-detection noise, which is $\underline{w}_{k_l}^H \underline{n}$. The post-detection SNR is indicative of the SNR achieved for a detected symbol stream after the receiver processing to remove interference from the other symbol streams. The improvement in the post-detection SNR comes from the fact that the norm of $\underline{w}_{k_l}$ in equation (7) decreases with each stage.

The analysis described above may also be performed based on other space or space-time processing techniques. The zero-forcing (CCMI), MMSE, DFE, and MMSE-LE techniques are described in detail in commonly assigned U.S. patent application Ser. No. 09/993,087, entitled "Multiple-Access Multiple-Input Multiple-Output (MIMO) Communication System," filed Nov. 6, 2001.

The SIC receiver can evaluate each of the $N_T!$ possible orderings of recovering the transmitted symbol streams. For each ordering k, the SIC receiver can compute a set of $N_T$ post-detection SNRs for the $N_T$ transmit antennas. The SIC receiver can then select one of the $N_T!$ possible orderings for use based on one or more criteria. For example, the selection may be based on overall spectral efficiency. In this case, the post-detection SNR for each transmit antenna may be converted to spectral efficiency, as follows:

$$C_{k_l} = \log_2(1 + SNR_{k_l}) = \log_2\left(1 + \frac{1}{\sigma^2 \|\underline{w}_{k_l}\|^2}\right), \quad \text{Eq (8)}$$

where $C_{k_l}$ is the spectral efficiency of transmit antenna $k_l$, which is recovered in stage l of ordering k. Spectral efficiency is equal to data rate normalized by the system bandwidth, and is given in units of bits per second per Hertz (bps/Hz). The overall spectral efficiency $C_{total,k}$ for all $N_T$ transmit antennas for ordering k may be computed as follows:

$$C_{total,k} = \sum_{l=1}^{N_T} C_{k_l} = \sum_{l=1}^{N_T} \log_2(1 + SNR_{k_l}). \quad \text{Eq (9)}$$

The receiver can compute the overall spectral efficiency for each of the $N_T!$ possible orderings. The receiver can then select the ordering with the highest overall spectral efficiency for use $$\left(\text{i.e., } \max_k \{C_{total,k}\}\right).$$

The MIMO system may be designed to support a set of discrete data rates, which includes non-zero data rates as well as the null or zero data rate. Each non-zero data rate may be associated with a particular coding scheme, a particular modulation scheme, and so on. Each non-zero data rate is further associated with a particular minimum SNR required to achieve the desired level of performance (e.g., 1% packet error rate) for a non-fading, AWGN channel. The required SNR for each non-zero data rate may be determined based on computer simulation, empirical measurements, and so on, as is known in the art. A look-up table may be used to store the supported data rates and their required SNRs.

The selected ordering (e.g., the one with the highest overall spectral efficiency) is associated with a set of $N_T$ post-detection SNRs for the $N_T$ transmit antennas. The highest data rate that may be reliably transmitted from each transmit antenna is determined by its post-detection SNR. In particular, the post-detection SNR for each transmit antenna should be equal to or higher than the required SNR for the data rate selected for that transmit antenna.

With selection diversity, each transmit antenna may be turned off (i.e., shut off) if its post-detection SNR is lower than the required SNR for the lowest non-zero data rate $r_{min}$ supported by the MIMO system. By turning off transmit antennas that cannot support the lowest non-zero data rate, the symbol streams sent from other transmit antennas may experience less interference and may be able to achieve higher post-detection SNRs. Improved performance in terms of higher data rates and/or greater reliability may be achieved.

For a SIC receiver with selection diversity, there are $N_{total}$ possible orderings for evaluation, where $N_{total} > N_T!$ and may be computed as follows. For $N_T$ transmit antennas, there are $N_T$ different antenna configurations, where each configuration corresponds to a specific number of transmit antennas that is turned on. The $N_T$ antenna configurations are given in column 1 of Table 1, and the number of active transmit antennas for each configuration is given in column 2. Each antenna configuration is associated with one or more antenna patterns, where each antenna pattern indicates which transmit antennas are turned on and which transmit antennas are turned off. It can be shown that there are: (1) only one antenna pattern for the configuration with all $N_T$ transmit antennas turned on, (2) $N_T$ possible antenna patterns for the configuration with $(N_T-1)$ transmit antennas turned on, (3) $N_T \cdot (N_T-1)/2$ possible antenna patterns for the configuration with $(N_T-2)$ transmit antennas turned on, and so on, and (4) $N_T$ possible antenna patterns for the configuration with only one transmit antenna turned on. The number of antenna patterns for each configuration is given in column 3 of Table 1.

For each antenna pattern, the number of possible orderings for that antenna pattern is dependent on the active transmit antennas that are turned on and is not dependent on the inactive transmit antennas that are turned off. Thus, for configuration 1 with all $N_T$ transmit antennas turned on, there are $N_T!$ possible orderings for recovering the $N_T$ active transmit antennas, as described above. For configuration 2 with $(N_T-1)$ transmit antennas turned on, there are $(N_T-1)!$ possible orderings for recovering the $(N_T-1)$ active transmit antennas for each antenna pattern of configuration 2. For configuration 3 with $(N_T-2)$ transmit antennas turned on, there are $(N_T-2)!$ possible orderings for recovering the $(N_T-2)$ active transmit antennas for each antenna pattern of configuration 3. The computation proceeds in similar manner for other configurations. For configuration $N_T$ with one transmit antenna turned on, there is only one possible ordering for recovering the single active transmit antenna for each antenna pattern of configuration $N_T$. The number of orderings for each antenna pattern of each configuration is given in column 4 of Table 1.

The number of orderings for each antenna configuration is obtained by multiplying the number of antenna patterns for that configuration with the number of orderings for each antenna pattern of that configuration. This is given in column 5 of Table 1. The total number of possible orderings, $N_{total}$, with selection diversity is then obtained by summing the quantities in column 5 of Table 1, as follows:

$$N_{total} = N_T! + N_T! + N_T!/2 + \ldots + N_T \cdot (N_T-1) + N_T,$$

which can be rewritten as follows:

$$N_{total} = (N_T!) \cdot \left(1 + \frac{1}{1!} + \frac{1}{2!} + \ldots \frac{1}{(N_T-2)!} + \frac{1}{(N_T-1)!}\right). \quad \text{Eq (10)}$$

TABLE 1

| Antenna Configuration | Number of Transmit Antennas Turned On | Number of Antenna Patterns for Configuration | Number of Orderings/Antenna Pattern | Number of Orderings for Configuration |
|---|---|---|---|---|
| 1 | $N_T$ | 1 | $N_T!$ | $N_T!$ |
| 2 | $(N_T-1)$ | $N_T$ | $(N_T-1)!$ | $N_T!$ |
| 3 | $(N_T-2)$ | $N_T \cdot (N_T-1)/2$ | $(N_T-2)!$ | $N_T!/2$ |
| . | . | . | . | . |
| . | . | . | . | . |
| . | . | . | . | . |
| $(N_T-1)$ | 2 | $N_T \cdot (N_T-1)/2$ | $2!$ | $N_T \cdot (N_T-1)$ |
| $N_T$ | 1 | $N_T$ | $1!$ | $N_T$ |

Viewed differently, if each transmit antenna can be turned on or off independently, then there are $2^{N_T}$ possible antenna patterns. For example, if $N_T=4$, then there are $2^{N_T}=16$ possible antenna patterns, which are represented as '0000', '0001', '0010', '0011', ..., and '1111', where '1' indicates an active antenna that is turned on and '0' indicates an inactive antenna that is turned off. The pattern with all zeros is not evaluated if at least one transmit antenna is used for data transmission. Thus, there are a total of $(2^N-1)$ active antenna patterns to evaluate.

For each active antenna pattern m with $N_{act,m}$ transmit antennas that are turned on, the SIC receiver can evaluate the $N_{act,m}!$ possible orderings of recovering the symbol streams sent from the $N_{act,m}$ active transmit antennas. For each of the $N_{act,m}!$ possible orderings for a given active antenna pattern, the SIC receiver can (1) obtain a set of post-detection SNRs for the active transmit antennas in that pattern m (the post-detection SNR for a transmit antenna that is turned off may be set to zero) and (2) compute the overall spectral efficiency for that ordering/pattern. The SIC receiver can then select the ordering/pattern with the highest overall spectral efficiency among the $N_{total}$ possible orderings.

The SIC receiver with selection diversity may evaluate the $N_{total}$ possible orderings based on the following pseudo-code:

```
10    For m=1 to 2^NT-1 active antenna patterns
20        For k=1 to N_act,m! orderings {
30            For l =1 to N_act,m stages {
40                Obtain detected symbol stream for transmit antenna
                      k_l;
50                Compute post-detection SNR for transmit antenna
                      k_l;
60                Compute spectral efficiency of transmit antenna k_l;
70            }
80            Compute overall spectral efficiency for ordering k of
                  pattern m;
90        }
100   Select the ordering/pattern with highest overall spectral efficiency
110   Determine the data rates for the N_T transmit antennas for the
          selected ordering/pattern
```

In the above pseudo-code, each active antenna pattern m defines a specific set of $N_{act,m}$ active transmit antennas and $(N_T-N_{act,m})$ inactive transmit antennas, where $N_{act,m}$ is dependent on the antenna pattern m. Each ordering k defines a specific order in which the $N_{act,m}$ active transmit antennas are recovered. The ordering may be represented as $\{k_1, k_2, \ldots k_l, \ldots k_{N_{act,m}}\}$ where the $(N_T-N_{act,m})$ inactive transmit antennas are not included in the set and $k_l$ is the transmit antenna to recover in stage l of ordering k. Different orderings have different mappings of transmit antennas to the set $\{k_1, k_2, \ldots k_l, \ldots k_{N_{act,m}}\}$. Whether or not a given transmit antenna is active is determined by the active antenna pattern m. The brute-force method described above evaluates $N_{total}$ possible orderings for the SIC receiver with selection diversity.

A simplified method is provided herein that evaluates at most $N_T!$ possible orderings to determine the data rates for the transmit antennas and the best ordering for the SIC receiver with selection diversity. This represents a substantial reduction over the $N_{total}$ possible orderings evaluated by the brute-force method. The simplification is based on a lemma which states that, for any specific ordering with a zero data rate for at least one transmit antenna, there exists another ordering with non-zero data rates for all transmit antennas with the same or greater throughput. This lemma indicates that the active antenna pattern of all ones ('111 ... 1') provides the highest throughput of all $(2^{N_T}-1)$ active antenna patterns and is the only one that needs to be evaluated.

For simplicity, the proof of the lemma is described below for the case in which only one transmit antenna is turned off. For the proof, the transmit antennas are given indices of 1, 2, ... $N_T$ and are recovered based on the ordering $\{1, 2, \ldots N_T\}$ where transmit antenna 1 is recovered first and transmit antenna $N_T$ is recovered last. Transmit antenna i is switched off, where $1 \leq i \leq N_T$. The data rates supported by the $N_T$ transmit antennas are denoted as $\{r_1, r_2, \ldots, r_{i-1}, 0, r_{i+1}, \ldots, r_{N_T}\}$. These data rates are obtained based on the post-detection SNRs for the transmit antennas.

For a SIC receiver, the data rate supported by each transmit antenna n is dependent only on the data rates of subsequently recovered transmit antennas $\{n+1, n+2, \ldots N_T\}$ and is not dependent on the data rates of prior recovered transmit antennas $\{1, 2, \ldots n-1\}$. This property assumes that the interference due to the prior recovered transmit antennas is effectively canceled and has no impact on transmit antenna n. Based on this property, the $N_T$ transmit antennas in the original ordering can be rearranged so that transmit antenna i is now the first antenna and the original ordering is otherwise preserved. This rearrangement does not impact the data rates for any of the $(N_T-1)$ active transmit antennas.

The new antenna ordering is then $\{i, 1, 2, \ldots, i-1, i+1, \ldots, N_T\}$ and the associated data rates are $\{0, r_1, r_2, \ldots, r_{i-1}, r_{i+1}, \ldots, r_{N_T}\}$. For this new ordering, since transmit antenna i is recovered first, the data rate used for transmit antenna i does not affect the data rates for the other $(N_T-1)$ transmit antennas, so long as transmit antenna can be recovered error-free or with low error and its interference can be canceled. A non-zero data rate may then be used for transmit antenna i and this data rate is dependent on the data rates for the other $(N_T-1)$ transmit antennas. Thus, the data rates achievable by the original ordering with transmit antenna i turned off can also be achieved by the new ordering with a non-zero rate for transmit antenna i. The proof of the lemma may be extended in similar manner to cases where multiple transmit antennas are turned off.

Figure 3:
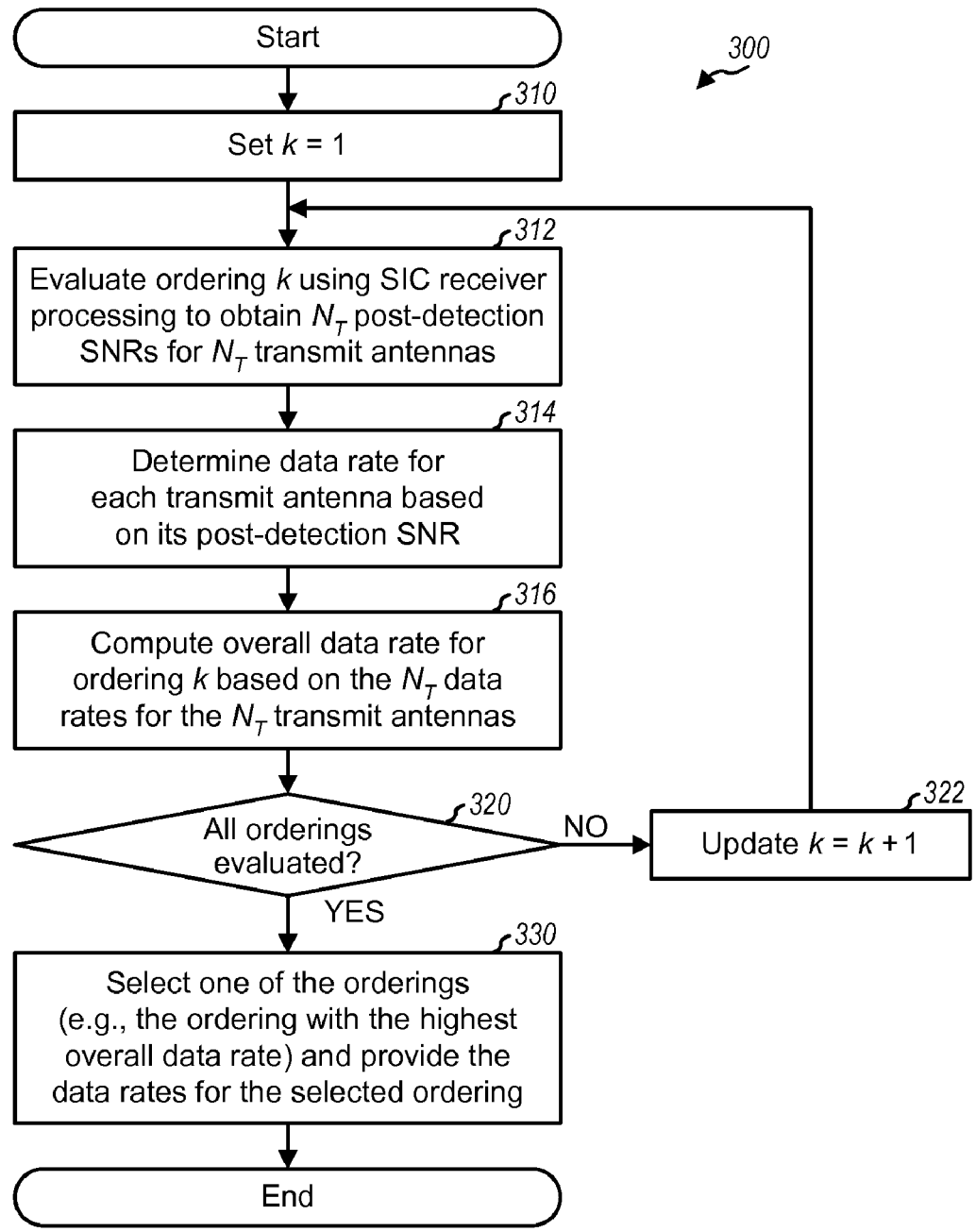
FIG. 3 shows a process for determining the data rates for the transmit antennas and the best ordering for a SIC receiver with selection diversity.

FIG. 3 shows a flow diagram of a process 300 for determining the data rates for the $N_T$ transmit antennas and the ordering for a SIC receiver with selection diversity. Initially, the index k used for the possible orderings is set to 1 (step 310). Ordering k is evaluated using SIC receiver processing to obtain $N_T$ post-detection SNRs for $N_T$ transmit antennas (312). The data rate for each transmit antenna is then determined based on its post-detection SNR (step 314). The data rate for each transmit antenna may be one of the discrete data rates supported by the system. A zero data rate is used for each transmit antenna with a post-detection SNR worse than the minimum required SNR, which may be the required SNR for the lowest non-zero data rate supported by the system. $N_T$ data rates are obtained for $N_T$ transmit antennas for ordering k, where any of the $N_T$ data rates may be the zero data rate. An overall data rate is computed for ordering k based on the $N_T$ data rates (step 316).

A determination is then made whether or not all orderings have been evaluated (step 320). If the answer is 'no', then the ordering index k is updated (step 322) and the process returns to step 312 to evaluate the next ordering. A maximum of $N_T!$ orderings are evaluated. If all of the orderings have been evaluated, then one of the evaluated orderings is selected based on their overall data rates (step 330). For example, the selected ordering may be the one with the highest overall data rate among all of the orderings evaluated.

Process 300 may be performed by receiver system 150 and the data rates for the selected ordering may be sent to transmitter system 110 as feedback information. Alternatively or additionally, process 300 may be performed by transmitter system 110. In any case, transmitter system 110 processes up to $N_T$ symbol streams at the data rates for the selected ordering and transmits these symbol streams from the $N_T$ transmit antennas. Receiver system 150 recovers the transmitted symbol streams in accordance with the selected ordering.

Figure 4:
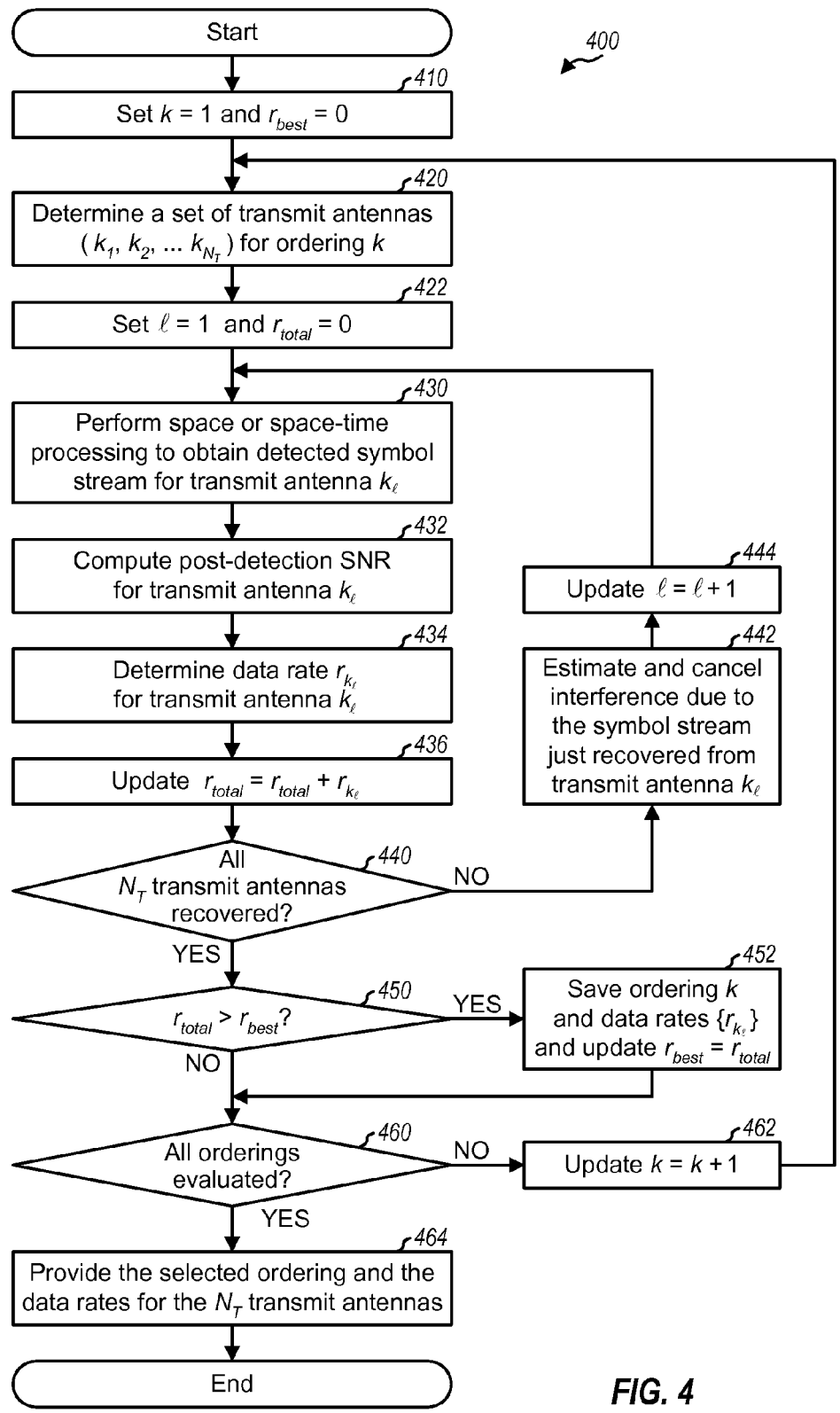
FIG. 4 shows a specific implementation of the process in FIG. 3.

FIG. 4 shows a flow diagram of a process 400 for determining the data rates for the transmit antennas and the ordering for a SIC receiver with selection diversity. Process 400 is a specific implementation of process 300 in FIG. 3. Initially, the ordering index k is set to 1 and the variable $r_{best}$ for the best overall data rate is set to 0 (step 410).

To evaluate ordering k, the order of recovering the transmit antennas $\{k_1, k_2, \ldots k_{N_T}\}$ is first determined (step 420). The stage index f is set to 1 and the variable $r_{total}$ for the overall data rate for ordering k is set to 0 (step 422). For each stage l, spatial or space-time processing is first performed on the $N_R$ input symbol streams $\underline{y}_k^l$ to obtain the detected symbol stream $\hat{x}_{k_l}$ for transmit antenna $k_l$ to be recovered in that stage (step 430). This can be achieved by (1) obtaining the ZF equalizer response matrix $\underline{W}_k^l$ for stage l based on the reduced channel response matrix $\underline{H}_k^l$, as shown in equation (4), and (2) multiplying the input symbol streams $\underline{y}_k^l$ with the matched filter vector $\underline{w}_{k_l}$ for transmit antenna $k_l$ as shown in equation (6). The post-detection SNR for transmit antenna $k_l$ is then computed as shown in equation (7) (step 432). The data rate $r_{k_l}$ for transmit antenna $k_l$ is determined based on its post-detection SNR (e.g., as shown in equation (8) or using a look-up table) (step 434). The overall data rate for ordering k is then updated as $r_{total}=r_{total}+r_{k_l}$ (step 436).

A determination is then made whether or not all transmit antennas have been recovered for ordering k (step 440). If the answer is 'no', then the interference due to the just recovered symbol stream from transmit antenna $k_l$ is estimated and canceled from the input symbol streams $\underline{y}_k^l$ to obtain the input symbol streams $\underline{y}_k^{l+1}$ for the next stage (step 442). The stage index is then updated as l=l+1 (step 444), and the process returns to step 430 to recover another symbol stream for another transmit antenna.

If all transmit antennas have been recovered (i.e., the answer is 'yes' for step 440), then a determination is made whether or not the overall data rate for ordering k is higher than the best overall data rate thus far (step 450). If the answer is 'yes', then the ordering k and the data rates $\{r_{k_j}\}$ for the transmit antennas are saved, and the best overall data rate is set to the overall data rate for ordering k (i.e., $r_{best}=r_{total}$) (step 452). If the answer is 'no' in step 450, then the results for ordering k are not saved. In any case, a determination is next made whether or not all orderings have been evaluated (step 460). If the answer is 'no', then the ordering index k is updated as k=k+1 (step 462), and the process returns to step 420 to evaluate this new ordering. Otherwise, the best ordering and the data rates for the transmit antennas are provided (step 464). The process then terminates.

For clarity, the techniques for performing SIC receiver processing with selection diversity have been described for a MIMO system. These techniques may also be used for other systems such as, for example, a MIMO-OFDM system. For the MIMO-OFDM system, one symbol stream may be transmitted from all subbands of each transmit antenna using OFDM processing. At the receiver, the post-detection SNR may be determined for each subband of each transmit antenna. The post-detection SNRs of all subbands of each transmit antenna may be combined to obtain the post-detection SNR for that transmit antenna. The ordering and data rates may then be selected based on the post-detection SNRs for the transmit antennas as described above.

Transmitter System

Figure 5:
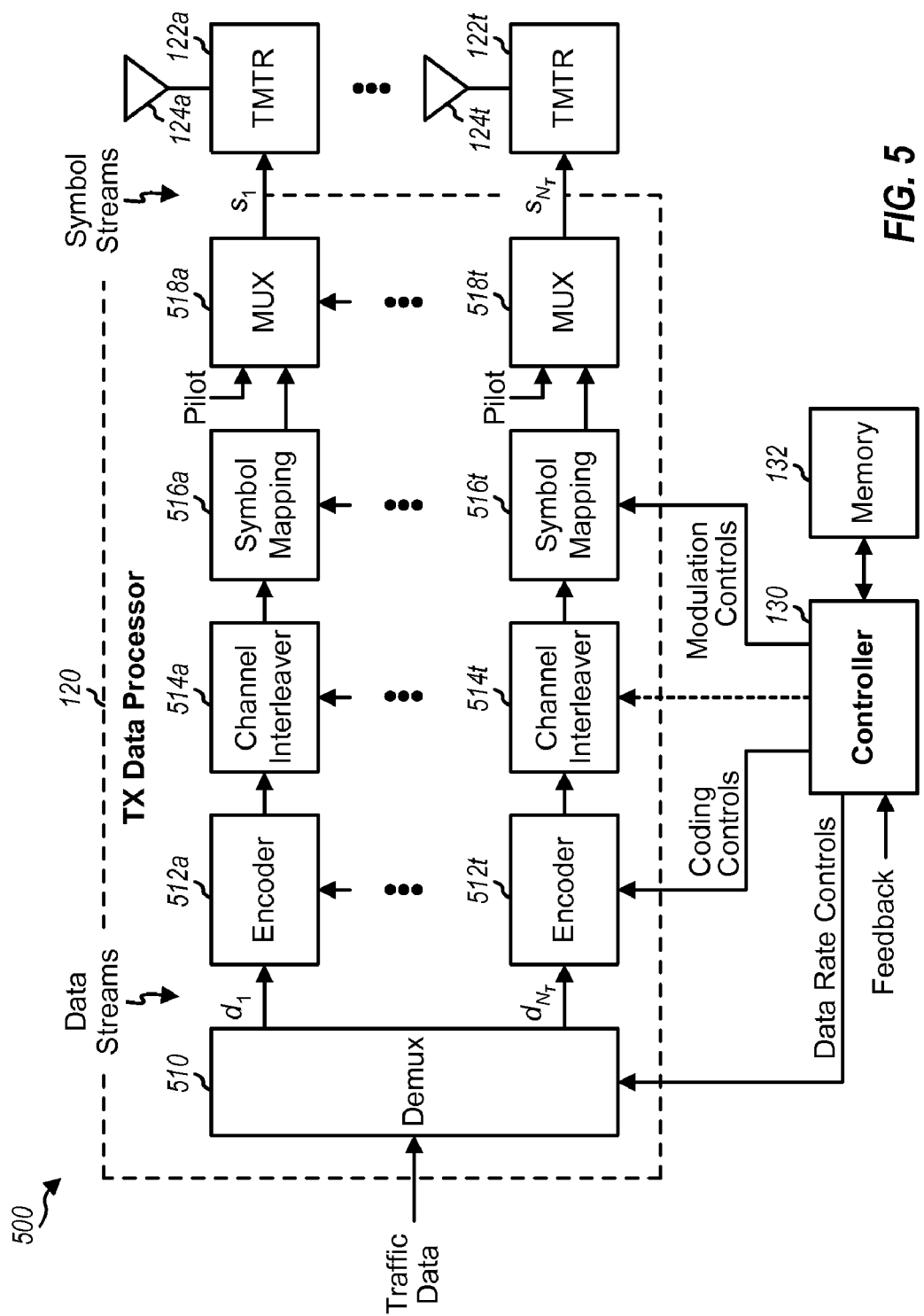
FIG. 5 shows a block diagram of a transmitter subsystem.

FIG. 5 shows a block diagram of a transmitter subsystem 500, which is an embodiment of the transmitter portion of transmitter system 110 in FIG. 1. For this embodiment, TX data processor 120 includes a demultiplexer (Demux) 510, $N_T$ encoders 512a through 512t, $N_T$ channel interleavers 514a through 514t, $N_T$ symbol mapping units 516a through 516t, and $N_T$ multiplexers (Muxes) 518a through 518t (i.e., one set of encoder, channel interleaver, symbol mapping unit, and multiplexer for each of the $N_T$ transmit antennas). Demultiplexer 510 demultiplexes the traffic data (i.e., the information bits) into up to $N_T$ data streams. One data stream is provided for each transmit antenna with a non-zero data rate. Each data stream is provided at the data rate selected for the transmit antenna, as indicated by the data rate control.

Each encoder 512 receives and encodes a respective data stream based on the selected coding scheme (as indicated by the coding control) and provides code bits. The coding increases the reliability of the data transmission. The selected coding scheme may include any combination of CRC coding, convolutional coding, turbo coding, block coding, and so on. Each encoder 512 provides code bits to a respective channel interleaver 514, which interleaves the code bits based on a particular interleaving scheme. If the interleaving is dependent on data rate, then controller 130 provides an interleaving control (as indicated by the dashed line) to channel interleaver 514. The interleaving provides time, frequency, and/or spatial diversity for the code bits.

Each channel interleaver 514 provides interleaved bits to a respective symbol mapping unit 516, which maps (i.e., modulates) the interleaved bits based on the selected modulation scheme (as indicated by the modulation control) and provides modulation symbols. Unit 516 groups each set of B interleaved bits to form a B-bit binary value, where $B \geq 1$, and further maps each B-bit value to a specific modulation symbol based on the selected modulation scheme (e.g., QPSK, M-PSK, or M-QAM, where $M=2^B$). Each modulation symbol is a complex value in a signal constellation defined by the selected modulation scheme. Each symbol mapping unit 516 provides modulation symbols (or "data symbols") to a respective multiplexer 518, which multiplexes the data symbols with pilot symbols using, for example, time division multiplex (TDM) or code division multiplex (CDM). Multiplexers 518a through 518t provide up to $N_T$ symbol streams to transmitter units 122a through 122t, which process these symbol streams to obtain modulated signals. Other designs for transmitter subsystem 500 may also be used and are within the scope of the invention.

Controller 130 may perform various functions for data transmission from the $N_T$ transmit antennas. For example, controller 130 may receive the $N_T$ data rates for the $N_T$ transmit antennas (where one or more of these data rates may be zero) as feedback information from receiver system 150. Controller 130 may then generate the data rate, coding, interleaving, and modulation controls for the processing units within TX data processor 120. Alternatively, controller 130 may receive the channel response estimates, evaluate the possible orderings, select the ordering and data rates for the transmit antennas, and generate the controls for the processing units within TX data processor 120.

Receiver System

FIG. 6 shows a block diagram of a receiver subsystem 600, which is an embodiment of the receiver portion of receiver system 150 in FIG. 1. For this embodiment, RX MIMO/data processor 160 includes $N_T$ successive (i.e., cascaded) receiver processing stages 610a through 610t, one stage for each of the $N_T$ transmit antennas. Each receiver processing stage 610 (except for the last stage 610t) includes a spatial processor 620, an RX data processor 630, and an interference canceller 640. The last stage 610t includes only spatial processor 620t and RX data processor 630t.

For the first stage 610a, spatial processor 620a receives the $N_R$ received symbol streams $\underline{y}$, performs spatial or space-time processing (e.g., zero-forcing) on the received symbol streams, and provides the detected symbol stream $\hat{x}_{k_1}$ for the first transmit antenna in the selected ordering k. RX data processor 630a further processes (e.g., demodulates, deinterleaves, and decodes) the detected symbol stream $\hat{x}_{k_1}$ to obtain a decoded data stream $\hat{d}_{k_1}$, which is an estimate of the data stream $d_{k_1}$ for the symbol stream $x_{k_1}$ being recovered.

For the first stage 610a, interference canceller 640a receives the $N_R$ received symbol streams $\underline{y}$ and the decoded data stream $\hat{d}_{k_1}$. Interference canceller 640a performs the processing (e.g., encoding, interleaving, and symbol mapping) to obtain a remodulated symbol stream, $\check{x}_{k_1}$, which is an estimate of the symbol stream $x_{k_1}$ just recovered. The remodulated symbol stream $\check{x}_{k_1}$ is further processed to obtain estimates of the interference components $\underline{i}_k^1$ due to the just recovered symbol stream. The interference components $\underline{i}_k^1$ are then subtracted from the first stage's input symbol streams $\underline{y}$ to obtain $N_R$ modified symbol streams $\underline{y}_k^2$, which include all but the cancelled interference components. The modified symbol streams $\underline{y}_k^2$ are then provided to the second stage.

For each of the second through last stages 610b through 610t, the spatial processor for that stage receives and processes the $N_R$ modified symbol streams $\underline{y}_k^l$ from the interference canceller in the preceding stage to obtain the detected symbol stream $\hat{x}_{k_l}$ for that stage. The detected symbol stream $\hat{x}_{k_l}$ is then processed by the RX data processor to obtain the decoded data stream $\hat{d}_{k_l}$. For each of the second through second-to-last stages, the interference canceller in that stage receives the $N_R$ modified symbol streams $\underline{y}_k^l$ from the interference canceller in the preceding stage and the decoded data stream $\hat{d}_{k_l}$ from the RX data processor within the same stage, derives the $N_R$ interference components $\underline{i}_k^l$ due to the symbol stream $x_{k_l}$ recovered by that stage, and provides $N_R$ modified symbol streams $\underline{y}_k^{l+1}$ for the next stage.

The SIC receiver processing is also described in commonly assigned U.S. patent application Ser. No. 10/120,966, entitled "Ordered Successive Interference Cancellation Receiver Processing for Multipath Channels," filed Apr. 9, 2002.

A channel estimator 650 also receives the $N_R$ received symbol streams $\underline{y}$, estimates the channel response matrix $\underline{H}$ and the noise variance $\sigma^2$ based on the received pilot symbols, and provides the channel response and noise estimates (e.g., $\underline{\hat{H}}$ and $\hat{\sigma}^2$). The estimated channel response matrix $\underline{\hat{H}}$ is used for space or space-time processing by all stages, as described above. Controller 170 receives the channel response and noise estimates, evaluates up to $N_T!$ possible orderings, computes the set of post-detection SNRs for each ordering, and determines the best ordering and the data rates for the selected ordering. Memory unit 172 stores a look-up table (LUT) 660 of supported data rates and their required SNRs. Look-up table 660 is used by controller 170 to determine the data rate for each transmit antenna based on its post-detection SNR. Controller 170 provides the selected ordering to RX data processor 160 and may provide the data rates for the selected ordering as feedback information to transmitter system 110.

The techniques described herein for supporting SIC receiver processing with selection diversity may be implemented by various means. For example, these techniques may be implemented in hardware, software, or a combination thereof. For a hardware implementation, the processing units for SIC receiver processing with selection diversity (e.g., TX data processor 120 and controller 130 at transmitter system 110, and RX spatial/data processor 160 and controller 170 at receiver system 150) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the SIC receiver processing with selection diversity may be implemented at the transmitter and receiver systems with modules (e.g., procedures, functions, and so on) that perform the functions described herein. The software codes may be stored in a memory unit (e.g., memory units 132 and 172 in FIG. 1) and executed by a processor (e.g., controllers 130 and 170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of determining a data transmission in a multiple-input multiple-output (MIMO) communication system, comprising:
   determining a data rate for each of a plurality of transmit antennas, for each order of a plurality of orders of decoding a plurality of symbol streams based on a post-detection SNR;
   computing an overall data rate for each order for the plurality of transmit antennas based on each data rate of a plurality of data rates for each order; and
   using a processor coupled with a memory operative in selecting one order of the plurality of orders based on each of the overall data rates.

2. The method of claim 1, wherein the plurality of orders is equal to no more than $N_T!$, where $N_T$ is a number of transmit antennas.

3. The method of claim 1, further comprising selecting a discrete data rate, for each order, of a set of discrete data rates based upon the computed overall data rate for each order.

4. The method of claim 1, wherein determining the data rate comprises setting the data rate to zero if post-detection SNR is below a minimum required SNR.

5. The method of claim 1, wherein the one order has a greater overall data rate than each of other of the plurality of orders.

6. An apparatus in a multiple-input multiple-output (MIMO) communication system comprising:
 memory means; and
 processor means coupled with the memory means wherein, the processor means is operative to select one order decoding a plurality of symbol streams according to an overall data rate of each of the plurality of orders, wherein the overall data rate for each order corresponds to a plurality of data rates for each of a plurality of transmit antennas.

7. The apparatus of claim 6, wherein a number of the plurality of orders is less than $N_T!$, where $N_T$ is a number of transmit antennas.

8. The apparatus of claim 6, wherein the memory is operative to store a set of discrete data rates supported by the system and a set of required SNRs for the set of discrete data rates.

9. The apparatus of claim 6, wherein the processor is operative to evaluate each of the plurality of orders based on channel response information and noise estimates.

10. The apparatus of claim 6, wherein the processor is operative to set the data rate to zero if post-detection SNR is below a minimum required SNR.

11. The apparatus of claim 6, wherein the one order has a greater overall data rate than each of other of the plurality of orders.

12. A processor-readable medium encoded with instructions for determining a data transmission in a multiple-input multiple-output (MIMO) communication system, the instructions comprising code for:
 determining a data rate for each of a plurality of transmit antennas, for each order of a plurality of orders of decoding a plurality of symbol streams based on a post-detection SNR;
 computing an overall data rate for each order for the plurality of transmit antennas based on each data rate of a plurality of data rates for each order; and
 selecting one order of the plurality of orders based on each of the overall data rates.

* * * * *